United States Patent Office 2,744,873
Patented May 8, 1956

2,744,873

MIXED NICKEL, ZINC, VANADIUM FERRITE

Leon T. Piekarski, Skaneateles, N. Y., assignor to General Electric Company, a corporation of New York No Drawing. Application November 8, 1952,
Serial No. 319,601

7 Claims. (Cl. 252—62.5)

The present invention relates to a mixed ferrite composition having improved magnetic properties. It is particularly concerned with a mixed spinel-type crystal ferrite consisting esentially of nickel ferrite, zinc ferrite and vanadium ferrite.

This application is a continuation-in-part of my application Serial No. 246,329, filed September 12, 1951, now abandoned, and assigned to the same assignee as the present invention.

Soft magnetic materials of the mixed ferrite type are known. They are described, for example, in Snoek patent 2,452,530 as comprising zinc ferrite having a low curie point combined with one or more cubic ferrites such as nickel ferrite of a higher curie point. The products have intermediate curie points between 40 and 250° C.

The present invention is based on the discovery that improved magnetic properties can be obtained by including in the known nickel zinc ferrites small amounts of vanadium ferrite as an essential constituent. More specifically, it has been found that nickel zinc vanadium ferrites containing from about 40 to 60, preferably 47 to 55, mol per cent iron oxide, $Fe_2O_3$, from about 18 to 32 mol per cent, preferably 25 to 30 mol per cent, zinc oxide, ZnO, from 0.1 to 1 mol per cent vanadium oxide, balance nickel oxide, NiO, are characterized by a combination of properties including a high initial permeability plus good Q values, and high D. C. resistivity values. By Q value is meant the numerical value obtained by dividing the radio frequency reactance by the resistance of a circuit in which the ferrite is introduced as an induction coil core body. Any of the vanadium oxides, $V_2O_2$, $V_2O_3$, $V_2O_4$, and $V_2O_5$, within the designated mol proportions can be employed. Ordinarily the trioxide or the pentoxide are used as they are more readily available commercially. Preferably the iron oxide and zinc oxide are used in such proportions that the nickel oxide content will range from about 20 to 35 mol per cent.

A particularly useful ferrite within the scope of the present invention is one containing 47 to 49 mol per cent iron oxide, 30 mol per cent zinc oxide, 0.5 mol per cent vanadium oxide and 21.5 per cent nickel oxide. The resultant mixed ferrite is characterized by a $\mu_0.Q$ (initial permeability $\times$ Q) value of 33,800 which is much higher than any known nickel zinc ferrites. Other preferred compositions having high $\mu_0.Q$ values are composed of 47–49 mol per cent iron oxide, 26–27 mol per cent nickel oxide, 25 mol per cent zinc oxide and 0.5 to 0.75 mol per cent vanadium oxide. Such compositions possess $\mu_0.Q$ values of from 31,000 to 46,000.

The ferrites of the present invention are prepared by mixing the finely divided oxides as, for example, by grinding them together in a colloid mill using water as a suspension medium. After thorough mixing, the water is driven off and the resutlant material pulverized to pass through a 40 mesh sieve. The resultant powder with or without the addition of a small amount of a temporary binder is molded into a suitable form and fired at a temperature of from 1100 to 1400° C., preferably 1100 to 1200° C., to obtain a reaction between the oxides forming the mixed crystal ferrites. A firing cycle requiring 6 hours to reach the temperature of about 1200° C., holding that temperature for 4 hours and cooling to room temperature in about 8 hours has been found to be satisfactory to obtain the desired heat reaction products. The firing is carried out in air, oxygen, nitrogen, argon, or other non-reducing atmosphere.

For best results, the vanadium oxide content should be at least 0.25 mol per cent and not more than about 0.90 mol per cent and preferably between 0.4 and 0.75 mol per cent. The effects obtained by varying the vanadium oxide content of a mixed ferrite obtained by firing mixtures of 48 mol per cent iron oxide and 30 mol per cent zinc oxide with the designated quantities of vanadium oxide and balance nickel oxide at 1200° C., are set forth in the following tables in which the initial magnetic permeability, $\mu_0$ and Q values were measured at 0.6 megacycle and $7.5 \times 10^{-4}$ oersteds on a ring sample, and the specific resistivity $\rho$ is the D. C. resistivity in meg.-cm.

Table I

| Percent Vanadium Oxide Added | $\mu_0$ | Q | $\rho$ | $B_r$ Gauss | $H_0$ Oersteds | $B_{H-10}$ | Curie Pt. (° K.) |
|---|---|---|---|---|---|---|---|
| 0.0 | 178.5 | 79.8 | 53.0 | 1,320 | 1.7 | 2,310 | 478 |
| 0.25 | 284.0 | 86.8 | 905.0 | 1,200 | 0.6 | 2,050 | |
| 0.5 | 485 | 69.8 | 3,770 | 1,000 | 0.65 | 2,100 | 423 |
| 0.75 | 283 | 86.4 | 6,940 | 700 | 0.80 | 1,900 | 457 |
| 1.0 | 321 | 29.6 | 64 | 700 | 0.50 | 1,900 | 442 |
| 2.0 | 203.5 | 21.2 | 14 | 500 | 0.85 | 1,800 | 437 |
| 4.0 | 52.8 | 36.0 | 0.3 | 225 | 1.8 | 850 | 455 |
| 8.0 | 29.4 | 29.6 | 0.002 | 50 | 0.80 | 300 | 451 |
| 12.0 | 25.1 | 33.4 | 0.002 | 100 | 1.0 | 350 | 451 |

As is indicated by the data in this table and the additional data given hereinafter, many of the vanadium-containing ferrites of the present invention can be employed advantageously for various magnetic core applications.

Ferrites having high curie points of from 530 to 555° K. have been prepared from fired mixtures of 25 mol per cent zinc oxide, 48 mol per cent iron oxide, various amounts of vanadium oxide, balance nickel oxide. The properties of some of these ferrites are set forth in Table II.

Table II

A

| Mol Percent $V_2O_5$ | $\rho$ (meg.-cm.) | $\mu_0$ | 0.6 Mc. (Room Temp.) | |
|---|---|---|---|---|
| | | | Q | $\mu_0 \cdot Q$ |
| 0.25 | 130 | 174.5 | 110.0 | 19,200 |
| 0.5 | 44,000 | 331 | ¹94 | 31,100 |
| 0.75 | 45,200 | 399 | ¹75 | 30,000 |
| 1.0 | 7,580 | 203 | 95.3 | 19,350 |

¹ Determined on a Q meter.

Except as otherwise indicated, the Q values in Tables II and III were calculated by the method described hereinbefore. In those cases where a Q meter was used, the measured resistance of the circuit was so low as to be subject to considerable doubt as to the effect of any small experimental error therein on the calculated Q value.

In the series of experiments detailed in Table II, the maximum $B_r$ and minimum $H_c$ values were obtained with the composition containing 0.5 mol per cent vanadium oxide.

In Table III, there are set forth some of the properties of ferrites prepared from mixtures of 48 mol per cent iron oxide, 0.5 mol per cent vanadium pentoxide, varying amounts of nickel oxide, balance zinc oxide which mixtures were fired at about 1200° C.

*Table III*

B

| Formula No. | Mol Percent NiO | $\rho$ (meg.-cm.) | Curie Temp. (° K.) | 0.6 Mc. (Room Temp.) | | |
|---|---|---|---|---|---|---|
| | | | | $\mu_0$ | Q | $\mu_0 \cdot Q$ |
| 335 | 22.5 | 3.20 | 501 | 505 | 44.6 | 22,500 |
| 334 | 24.5 | 1,380 | 525 | 527 | 73.0 | 38,400 |
| 205 | 26.5 | 44,000 | 536 | 331 | [1] 94 | 31,100 |
| 333 | 27.0 | 54,000 | 563 | 318 | [1] 49 | 15,600 |
| 279 | 27.5 | 148 | 566 | 319 | [1] 66 | 21,000 |
| 280 | 29.5 | 318 | 594 | 280 | [1] 81 | 22,700 |
| 281 | 31.5 | 615 | 623 | 224 | 87.5 | 19,600 |
| 282 | 33.5 | 13,280 | 638 | 158 | 78.0 | 12,300 |

[1] Determined on a Q meter.

Other compositions within the scope of the present invention and their properties are listed in Table IV.

*Table IV*

| Mol Percent | | $\mu_0$ | Q | $\mu_0 \cdot Q$ |
|---|---|---|---|---|
| $Fe_2O_3$ | NiO | | | |
| 54 | 20.5 | 320 | 36.4 | 11,640 |
| 52 | 22.5 | 489 | 31.6 | 15,452 |
| 50 | 24.5 | 354 | 44.2 | 15,647 |
| 46 | 28.5 | 116 | 79.5 | 9,240 |

All of the compositions of Table IV also contained 0.5 mol per cent $V_2O_5$, and 25 mol per cent zinc oxide.

From a consideration of the properties of the various specific ferrites described hereinbefore, it is apparent that some of them are particularly characterized by high permeability values and others by high Q values. Those having both high permeability and high Q values, or more specifically high $\mu_0 \cdot Q$ values are particularly useful as cores for television sweep transformers and other applications requiring a high permeability plus a relatively high Q value and a high D. C. resistivity.

What I claim as new and desire to secure by Letters Patent of the United States is:

1. A soft ferromagnetic mixed crystal ferrite consisting essentially of 40 to 60 mol per cent iron oxide, 0.1 to 1.0 mol per cent vanadium oxide, 18 to 32 mol per cent zinc oxide, balance nickel oxide.

2. The ferrite of claim 1 in which the iron oxide content is from 47 to 55 mol per cent.

3. The ferrite of claim 1 in which the nickel oxide content is from 20 to 35 mol per cent.

4. A soft magnetic mixed crystal ferrite material consisting essentially of nickel ferrite, zinc ferrite and vanadium ferrite and having a metal oxide content of 47 to 49 mol per cent iron oxide, 0.25 to 0.9 mol per cent vanadium oxide, 25 to 30 mol per cent zinc oxide, balance nickel oxide.

5. The ferrite of claim 4 in which the zinc oxide content is 25 mol per cent and the vanadium oxide content is from 0.5 to 0.75 mol per cent.

6. A soft ferromagnetic mixed crystal ferrite consisting essentially of about 48 mol per cent iron oxide, 30 mol per cent zinc oxide, 0.4 to 0.75 mol per cent vanadium oxide, balance nickel oxide.

7. A soft ferromagnetic mixed crystal ferrite consisting essentially of about 48 mol per cent iron oxide, 25 mol per cent zinc oxide, 0.5 mol per cent vanadium oxide, balance nickel oxide.

No references cited.